United States Patent [19]
Bibona et al.

[11] Patent Number: 5,342,473
[45] Date of Patent: Aug. 30, 1994

[54] APPARATUS FOR APPLYING HOT CUSHION GUM TO A TIRE CARCASS

[75] Inventors: Donald S. Bibona, Orange; Michael J. Allen, El Toro, both of Calif.; Jean C. Girard, Copley, Ohio

[73] Assignee: NRM Steelastic, Inc., Akron, Ohio

[21] Appl. No.: 747,809

[22] Filed: Aug. 20, 1991

[51] Int. Cl.$^5$ .......................................... B29D 30/56
[52] U.S. Cl. ................................. 156/394.1; 156/96; 156/500; 156/909; 425/17; 425/224
[58] Field of Search .................... 156/394.1, 909, 96, 156/129, 130, 405.1, 406.4, 500, 242, 397; 425/224, 17, 380, 381, 466, 190, 192 R, 461, 140, 150; 118/256, 258, 409, 413; 264/DIG. 74, 209.2, 177.16, 216

[56] References Cited

U.S. PATENT DOCUMENTS

| | | | |
|---|---|---|---|
| 3,459,613 | 8/1969 | Copenhefer et al. | 156/167 |
| 3,808,076 | 4/1974 | Barwell | 156/96 |
| 4,240,863 | 12/1980 | Vinton | 156/397 X |
| 5,129,356 | 7/1992 | Bandy et al. | 118/315 |
| 5,162,070 | 11/1992 | Meyer | 156/500 |

FOREIGN PATENT DOCUMENTS

| | | | |
|---|---|---|---|
| 0056704 | 7/1982 | European Pat. Off. | |
| 2733518 | 2/1978 | Fed. Rep. of Germany | 156/96 |
| 3541126 | 5/1987 | Fed. Rep. of Germany | |
| 2359700 | 2/1978 | France | |

Primary Examiner—Geoffrey L. Knable
Attorney, Agent, or Firm—Renner, Kenner, Greive, Bobak, Taylor & Weber

[57] ABSTRACT

Apparatus (10) for applying hot cushion gum (E) in a strip (12) of predetermined thickness and width to the crown surface (14) of a tire carcass (16) having a sagittal plane (68). The apparatus (10) includes a motor (M) for rotating the tire carcass (16), and extrusion means (18) for dispensing hot cushion gum through a die means (26). The angular disposition of the die means (26) may be selected relative to the sagittal plane (68) of the tire carcass (16) to determine the effective width of the strip (12) applied to the crown surface (14). rotational control mechanism (64) is also provided selectively to control the angular velocity of the rotating tire carcass (16) which determines the thickness of the strip (12). According to the present method a tire carcass (16) is mounted for rotation. The die head (26) is positionable at a selected angle ($\beta$) within its angular range ($\alpha$) measured transversely of the sagittal plane (68) of the tire carcass (16) to establish a selected, effective width ($W_{SEL}$) of the strip (12) as it is applied by the die head (26) to the crown surface (14). So disposed the die head is brought into slightly deforming engagement with the crown surface (14), and the tire carcass (16) is rotated at a predetermined angular velocity while hot cushion gum is extruded through the die head (26) onto the crown surface (14) of the tire carcass (16).

15 Claims, 4 Drawing Sheets

APPARATUS FOR APPLYING HOT CUSHION GUM TO A TIRE CARCASS

TECHNICAL FIELD

The present invention relates generally to tire retreading. More particularly, the present invention relates to a method and apparatus by which to prepare a tire carcass for retreading by the application of an extruded, single, hot strip of cushion gum to the crown surface of a tire carcass so that a pre-cured tread band may be applied, and bonded, to the crown surface. Specifically, the present invention relates to a method and apparatus for applying a strip of hot cushion gum material directly to the crown of a rotating tire carcass in a single pass by the use of a die head that is angularly adjustable with respect to the sagittal plane of the tire carcass to accommodate a range of carcass widths and wherein the angular velocity of the tire carcass is controlled in conjunction with the rate of extrusion to determine the thickness of the applied cushion gum.

BACKGROUND OF THE INVENTION

Presently, the art of retreading tires involves various methods and apparatus. Perhaps the most historically employed method is a "cold-capping" or "pre-cure retreading" operation which includes the following steps:

1. Remove the old, worn, or damaged tread.
2. Buff the tire carcass to provide a moderately textured surface for the adhesion of new tread rubber.
3. Apply a suitable adhesive to the textured carcass surface.
4. Apply a thin layer of a cold, calendered sheet of uncured cushion gum material to the circumferential periphery, or crown surface, of the tire carcass.
5. Apply a pre-cured tread band over the cushion gum.
6. Cure the cushion gum to bond the tread rubber integrally to the tire carcass.

To use the above-described "cold-capping" method, the cushion gum material was historically pre-manufactured in the form of a calendered sheet. The sheet is slit to various standardized widths and coiled with a plastic release film interposed between successive wraps of the sheet. The prepared coils of cushion gum would be maintained in inventory in a wide variety of widths until a need arises for cushion gum of that particular width.

Various problems are inherent to the above-described practice, and they include the need for rigorous inventory control to assure availability of the correct width and thickness of cushion gum for each tire carcass that might be encountered. The result is often at odds with the need for a timely turnover of the material in order to avoid deleterious aging of the stock on the shelf. In addition to aging, the stored coils of cushion gum are also subject to contamination, particularly along the exposed edges of the coiled cushion gum. The coils are also subject to oxidation as well as physical damage during handling.

As noted, this procedure requires that the crown surface on the tire carcass be buffed and then treated with an adhesive, or cement compound, prior to the application of the cold cushion gum. The adhesive may be applied by painting with a brush or by a roller or by spraying. Any of these processes require the expenditure of time and materials resulting in an increase in the retreading cost. Following the application of the adhesive, the operator selects the proper strip of cushion gum to be applied. The operator may have to search among the available inventory to locate a strip of the correct length, width and thickness. One end of the strip is manually applied to the carcass by the operator. The operator then operates a spin control to cause the tire carcass to rotate while a tensile force is being applied to the strip as it is maintained in alignment with the circumference of the carcass. When the entire circumference of the tire carcass is covered, the operator will stop the rotation of the carcass, retro-rotate the carcass slightly and cut the strip to length. The ends of the strip are then spliced in an overlapped fashion. The strip of cushion is stitched to the tire casing and the protective release film is removed. Thereafter the precured tread stock is manually applied and hand spliced (edge to edge). This splice is generally secured with staples.

One proposed solution to the problems found in the present practice of using calendered rolls of cushion gum stock is to limit the number of widths of the pre-manufactured gum stock maintained in inventory and trim the edges of the cushion gum after it has been applied to the tire carcass. Such an approach requires that wider-than-necessary rolls of cushion gum be customized to fit the width of several sizes of tire carcasses. Obviously, this proposal suffers not only from being wasteful but also from being labor-intensive.

In any event, the historic method of cold-capping with pre-calendered cushion gum requires that the user manually position the leading edge of a single, wide, strip of cushion gum fully across the crown of the tire carcass and then rotate the carcass through one revolution to wind the cushion gum about the circumference of the tire carcass with the release film facing radially outwardly. The presence of the release film tends to preclude contamination of the radially outer surface of the cushion gum, which would occur without the release film if the worker were not careful. The release film also permits the gum to be coiled without the successive layers adhering to each other and allows external stitching.

It should also be understood that faulty placement of the leading edge (generally mis-alignment) often requires that the initial portion of the cushion gum sheet be peeled off the tire carcass and be restarted. Of course, this tedious procedure may result in damage to the cushion gum sheet and/or degradation to the adhesion required between the cushion gum sheet and the crown surface of the tire carcass.

Typically, the entire circumferential extent of the tire carcass was wrapped with the cushion gum sheet prior to "cutting-in" the required splice. The cushion gum ply would then be roller-stitched to the tire carcass and the release film stripped off in preparation for the application of the pre-cured tread.

To alleviate some waste encountered with the above-described "cold-capping" practice, coiled rolls of calendered cushion gum material having an overall length sufficient to provide a stated plurality of tire carcasses of a given circumferential dimension are maintained in inventory. These rolls, while of a specific length for ease of handling, are not usually of an exact length to cover a specific number of tire carcasses, even if the rolls are intended to be for use with an exceedingly common tire size. Thus, short lengths of calendered gum material are generally discarded as excess, thus comprising waste stock. This practice obviously results in an additional cost to the operation.

Another historic method and apparatus available in the industry for retreading tires is known as the "hot-capping" procedure. The hot-capping procedure, and an exemplary apparatus for performing that method, are described in U.S. Pat. Nos.—No. 3,251,722 and 3,177,918—to R. G. Holman. According to the "hot-capping" technique, uncured tire tread material is layered onto the crown, and perhaps a portion of each shoulder, of a tire carcass to a sufficient radial thickness that the tire carcass, with the tread material adhering to the circumference thereof, can be received within a mold to form the tread design and to cure the tread rubber in situ.

The above-described "cold-capping" and "hot-capping" methods are distinctly different by reason of the type and condition of tire tread stock applied to the tire carcass and they are, therefore, considered non-related, or disassociated, technologies by knowledgeable entities working in this art.

More recently, the retreading industry adopted a method which extrudes, a hot cushion gum compound in a continuous spiral across at least the crown of a tire carcass in order to prepare the carcass for receiving a pre-cured tread stock. This is perhaps the most advanced method yet known, and while it works exceptionally well, and has greatly obviated the negative aspects of the prior art methods and apparatus, the present invention is deemed to be a still further improvement over the application of the hot cushion gum in a spiral path.

SUMMARY OF THE INVENTION

It is, therefore, a primary object of the present invention to provide an improved apparatus and method for applying hot, temperature controlled cushion gum compound to at least the crown surface of a tire carcass as a single strip.

It is another object of the present invention to provide an improved apparatus, as above, for applying a cushion gum strip to a tire carcass wherein the apparatus includes a die head capable of selective orientation in order effectively to apply a single strip of hot cushion gum to a spinning tire carcass at a width determined by the orientation of the die head with respect to the sagittal plane of the tire carcass in order selectively to accommodate a predetermined range of tire carcass widths.

It is a further object of the present invention to provide an improved apparatus and method, as above, for applying a hot cushion strip to tire carcass which permits one to maintain a reduced inventory of cushion gum strips and which also reduces the hand labor required.

It is a still further object of the present invention to provide an improved apparatus and method, as above, which permits one to eliminate the need to employ cement solvents, thereby obviating not only the release of hydrocarbons into the atmosphere but also the adverse environmental impact thereof.

It is still another object of the present invention to provide an improved method, as above, for applying a strip of cushion gum to a tire carcass wherein a die head is presented to the tire carcass at selective angular orientations which control the width of the strip, and wherein the tire carcass is rotated at a predetermined angular velocity to control the thickness of the strip.

These and other objects of the invention, as well as the advantages thereof over existing and prior art forms, which will be apparent in view of the following detailed specification, are accomplished by means hereinafter described and claimed.

In general, a method and apparatus embodying the concepts of the present invention will overcome the deficiencies found in the prior art. The apparatus not only eliminates the need for extensive hand labor currently required in selecting, applying and cutting the strip but also, because the temperature of the strip can be elevated, the cushion gum will tend to impregnate the crown surface of the tire carcass, thereby eliminating the need for the application of an adhesive.

The apparatus of the present invention includes an extruder and die head which are effective to present a strip of hot cushion gum having constant cross sectional dimensions to a buffed tire carcass. The tire carcass is mounted on a rotatable device which controls the angular velocity of the tire carcass.

The angular velocity of the tire carcass will affect, and control, the thickness of the hot cushion gum strip applied to the carcass. Specifically, the rotational control mechanism provides a range of angular velocities from slow to fast in order to establish a progressively thinner strip as the angular velocity increases. This is effective in eliminating the necessity to maintain an inventory of preformed strips in various thickness.

The die head is rotatably mounted on the extruder such that the angular disposition of the die head with respect to the sagittal plane of the tire carcass can be controlled. The effective width of the extruded strip, as applied to the carcass, can be controlled by selective angular disposition of the die head relative to the sagittal plane of the carcass. This permits the use of a single die head to accommodate a plurality of tire carcass widths. As compared with the prior art this will also reduce the stock inventory required to resurface tires of different widths.

As described above, the present invention will provide improvements over the prior art by:

a). permitting the cushion gum to be applied hot;

b). eliminating the need for the application of adhesive between the tire carcass and the cushion gum;

c). eliminating waste by extruding only the length needed to circumscribe the crown surface of the tire carcass;

d). eliminating the need to stock a wide variety of lengths, widths and thicknesses of the cushion gum; and, e). reducing costs to the end user, through the above improvements by providing an automatic system which greatly reduces the time required to apply the cushion gum to the crown of the tire carcass.

One exemplary embodiment of an apparatus and method for applying a hot cushion gum strip to a tire carcass through a rotatably adjustable die head embodying the concepts of the present invention and deemed sufficient to effect a full disclosure of the subject invention, is shown by way of example in the accompanying drawings and is described is detail without attempting to show all of the various forms and modifications in which the invention might be embodied; the invention being measured by the appended claims and not by the details of the specification.

DESCRIPTION OF AN EXEMPLARY EMBODIMENT

Figure 1:
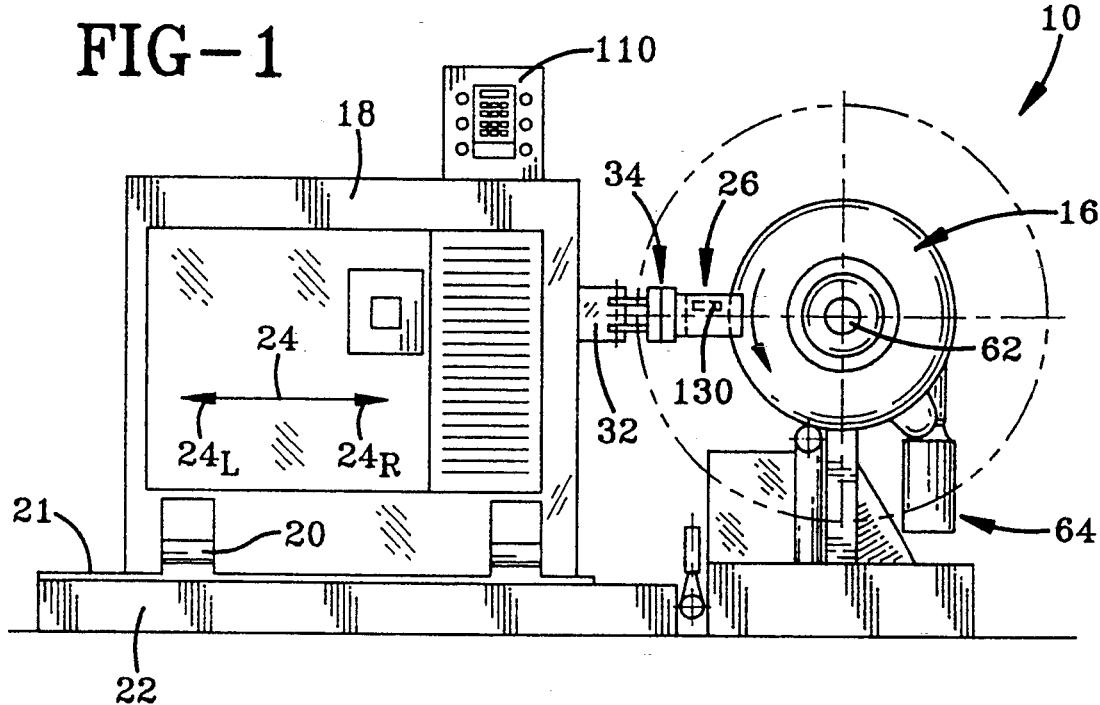
FIG. 1 is a elevational view of a representative apparatus embodying the concepts of the present invention.

Referring to the drawings wherein numerical designations represent the same or corresponding parts throughout the several views, one representative form of apparatus embodying the concepts of the present invention is designated generally by the numeral 10 (FIG. 1) on the accompanying drawings. The representative apparatus 10 for applying a strip 12 (FIG. 4) of cushion gum to the crown surface 14 of a tire carcass 16 employs a conventional extruder 18 which is operable to process cushion gum rubber compound "E" and to extrude the cushion gum compound "E" in a hot, viscous strip 12.

In the following description the directional terms: right, left, fore and aft are used with reference to directions on the drawings and are not meant to be terms of limitation.

The extruder 18 is mounted on a powered carriage 20 supported on rails 21 presented from a base 22 in order to permit selective fore and aft movement of the extruder 18 in the direction of arrow 24, as depicted in FIG. 1. Forward movement is arbitrarily selected to identify movement of the extruder 18 toward the tire carcass 16, as represented by the arrowhead $24_R$ facing to the right as viewed in FIG. 1, and rearward movement is designated as movement away from the tire carcass 16, as represented by the arrowhead $24_L$ which faces to the left as viewed in FIG. 1.

Figure 7:
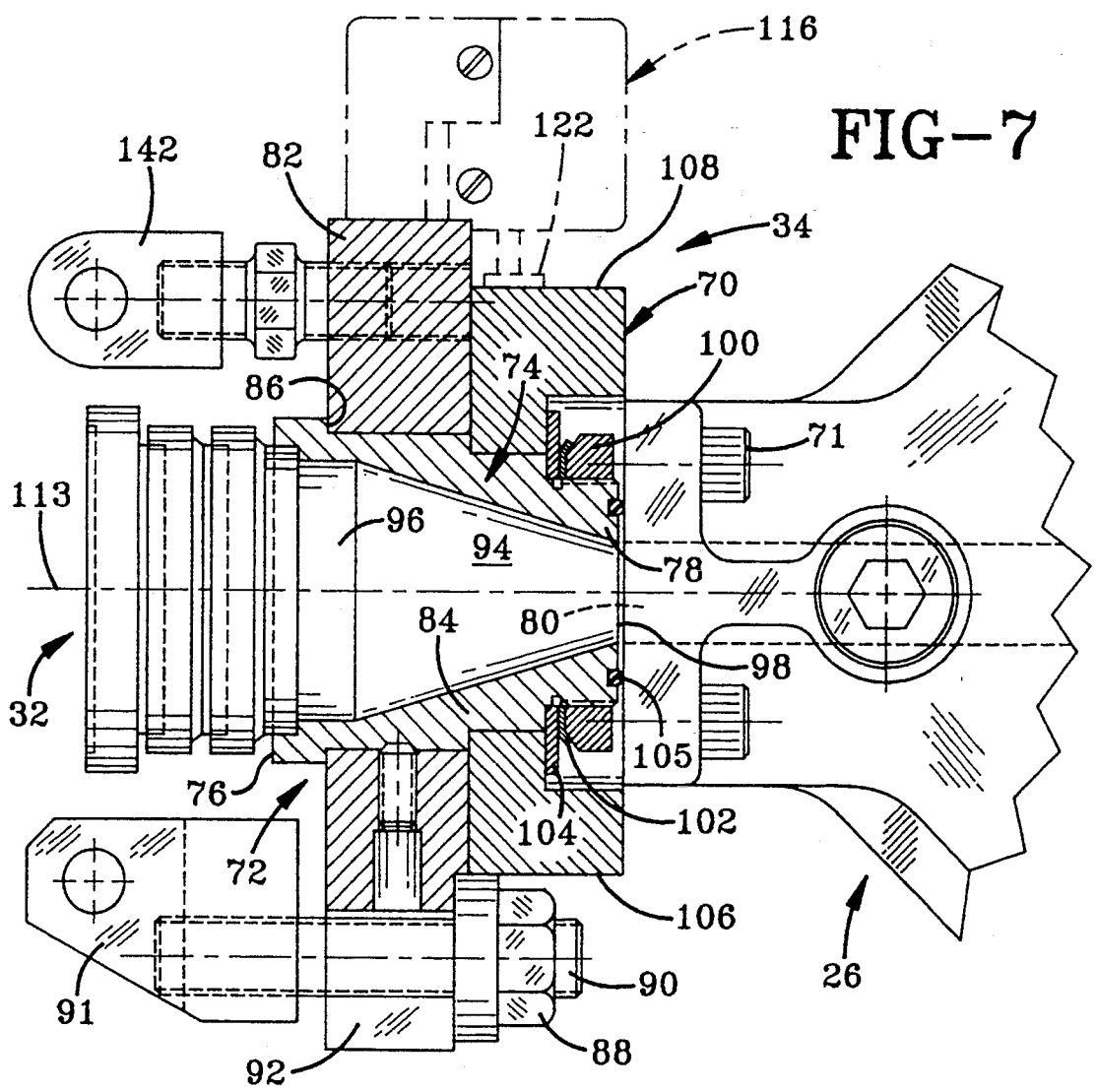
FIG. 7 is a sectional view through a representative rotary joint connection by which the die head, shown in top plan, is mounted to the extruder, FIG. 7 appears on the same sheet of drawings as FIG. 1.
Figure 2:
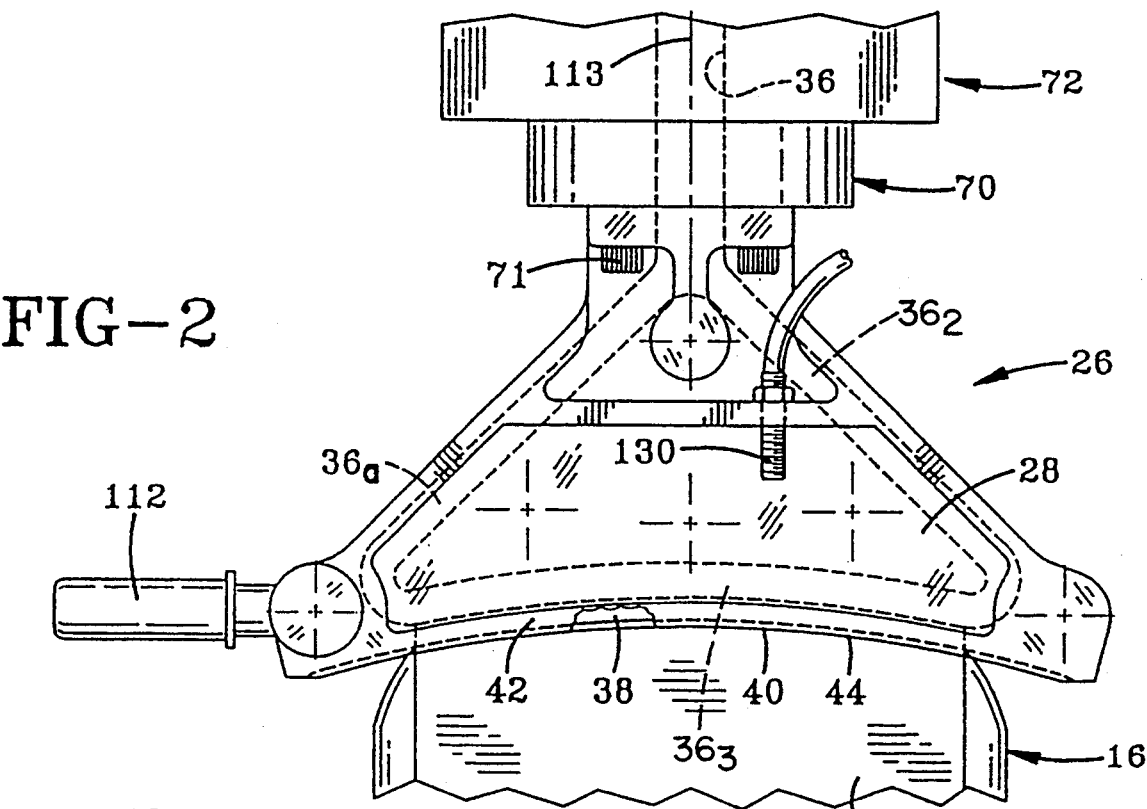
FIG. 2 is an enlarged, top plan view of a portion of the apparatus represented in FIG. 1, FIG. 2 depicting a die head disposed in abutment with the crown surface of a tire carcass.
Figure 3:
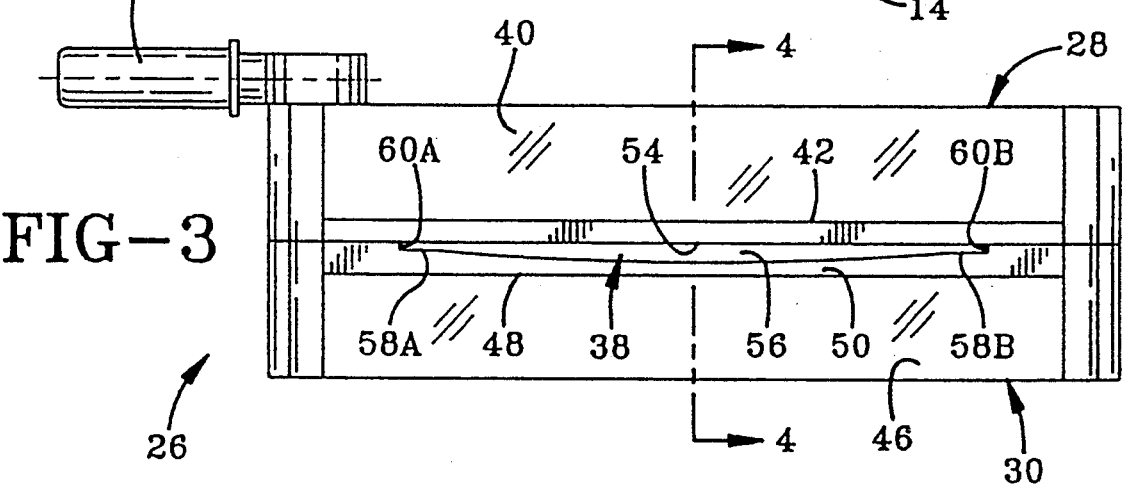
FIG. 3 is an end view of the die head shown in FIG. 2.
Figure 4:
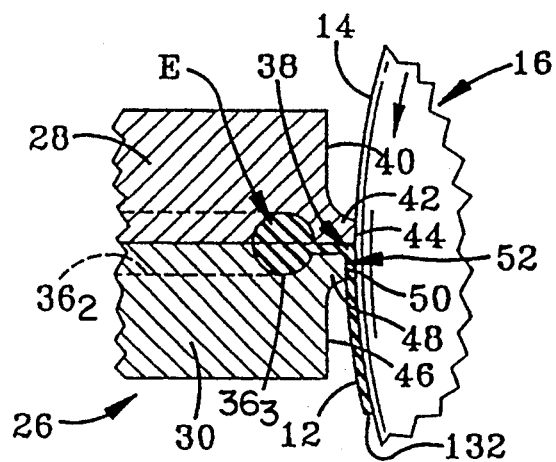
FIG. 4 is a cross sectional view taken substantially along line 4—4 in FIG. 3.

The extruder 18 has a die head 26 which, as seen in FIGS. 2 through 4, is comprised of an upper die plate 28 and a lower die plate 30. The die head 26 is mounted at the outlet 32 of the extruder 18 by a rotary joint connection 34, as best depicted in FIG. 7. The upper and lower die plates 28 and 30, respectively, delineate an extrudate passage 36 therebetween which terminates in a discharge orifice 38.

In order to provide a continuous discharge across the lateral extent of the discharge orifice 38, the configuration of the extrudate passage 36 and the configuration of the orifice 38 must cooperatively interact. In the exemplary arrangement depicted, the extrudate passage 36 enters the die head 26 as a single passage, as depicted, and then divides into divergent passageways $36_a$ and $36_2$ which are transversely conjoined by passageway $36_3$ which extends behind, and communicates with, the discharge orifice 38. A preferred structural configuration for an orifice 38 which cooperatively interacts with the aforesaid extrudate passage 36 will be described in detail immediately after the structural description of the die head 26 which follows.

The upper die plate 28 has an outer, surface 40 that is concavely curved, as best seen in FIGS. 2 and 4, and which presents an abutment lip 42 that terminates in a further outwardly facing contact edge 44 that is also concavely curved so as to be disposed generally concentric to the concavely curved surface 40. The curvature profile of the contact edge 44 is selected to provide substantially full engagement with the crown surface 14 of the tire carcass 16 during substantially the entire range through which the die head 26 is expected to be rotated with minimal deformation to the tire carcass 16. The modestly required deformation is achieved by moving the powered carriage 20 to the right, in the direction designated by the arrowhead $24_R$ so that the contact surface 44 is driven against the crown surface 14. In that manner the apparatus 10 can readily accommodate various diameters of tire carcasses 16.

The lower die plate 30 also has an outer surface 46 that is concavely curved, and which presents a further outwardly extending control lip 48 which terminates in a striking edge 50 that is generally concentric to the concavely curved surface 46. As best shown in FIG. 4, when the upper and lower die plates 28 and 30, respectively, are conjoined as the die head 26 the striking edge 50 is concentrically displaced with respect to the abutment edge 44.

As such, when the abutment edge 44 engages, and deforms, the crown surface 14 of a tire carcass 16 the striking edge 50 is displaced from the full width of the crown surface 14 by a predetermined distance. This separation between the crown 14 and the striking edge 50 defines an extrudate accumulating space 52. It is into this accumulating space 52 that the extrudate "E" is forced from the discharge orifice 38 onto the crown surface 14 of the tire carcass as a strip 16.

As is best seen in FIG. 3, the discharge orifice 38 of the extrudate passage 36 may, as shown, be primarily formed in the lower die plate 30. The upper wall 54 of the discharge orifice 38 may be the generally planar undersurface of the upper die plate 28 which extends outward onto the underside of the abutment lip 42. The opposed surface of the discharge orifice 38 is primarily defined by a transversely arcuate surface 56 which has a relatively long radius. For example, a discharge orifice 38 having a width of approximately 10.5 inches (26.67 cm) might well employ an arcuate surface 56 having a radius of approximately 48.29 inches (122.56 cm). The transverse ends of the arcuate surface 56 merge into linear surfaces 58A and 58B in the lower die plate 30. The linear surfaces 58 are preferably near parallel to the upper wall 54 of the discharge orifice 38 and they, in turn, terminate in the side walls 60A and 60B. The side walls 60 are perpendicular to the upper wall 54 and, in fact, will intersect the upper wall 54 when the die plates 28 and 30 are conjoined as a die head 26. It has been found that a discharge orifice 38 having the configuration described will provide a substantially constant volumetric rate of extrudate "E" across the width of the die head 26, particularly when it receives the extrudate from a passageway $36_3$ located immediately behind, and which extends the full extent of, the discharge orifice 38—the passageway $36_3$ being supplied with extrudate from the passageways $36_1$ and $36_2$ which force the extrudate into the opposite ends of the passageway $36_3$. The flow path of the extrudate, together with the unique configuration of the discharge orifice 38, combine to provide the aforesaid constant volumetric discharge rate.

Figure 8:
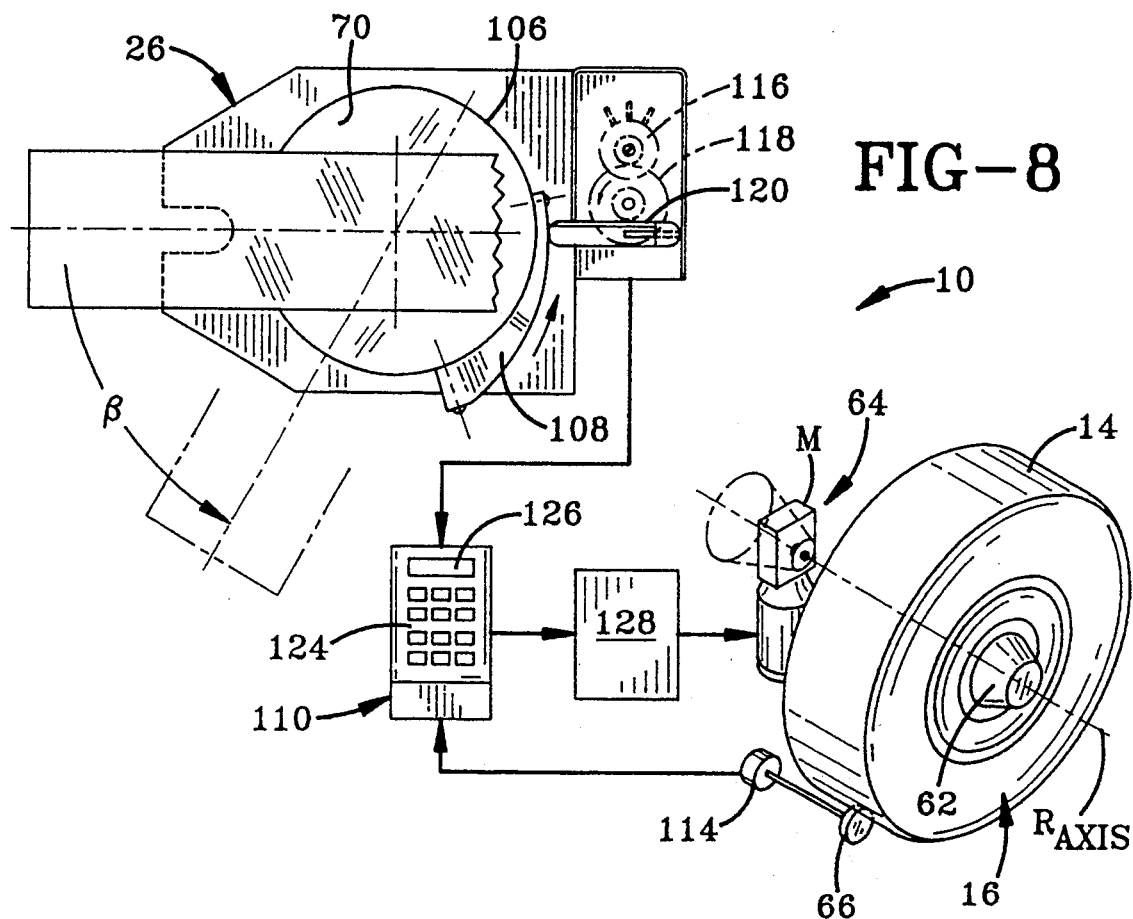
FIG. 8 is a diagrammatic representation of a typical system which may be employed to sense the angular disposition of the die head and automatically control the rotational displacement of the tire carcass.

As schematically represented in FIG. 1, the tire carcass 16 may be rotatably mounted on a hub 62 that is presented from a rotational control mechanism 64 which may, as is well known in the art, include a variable speed electric drive motor "M" (best shown in FIG. 8). The powered carriage 20 by which the extruder 18 is supported from the base 22 permits the extruder 18, and the die head 26, to be moved to the right in the direction of arrowhead $24_R$ and into modestly deformative abutment with the crown surface 14 on the tire carcass 16 when it is desired to extrude a single strip 12 of hot cushion gum which is thereby "wiped" onto the crown surface 14. The tire carcass 16 is rotated about the rotational axis $R_{AXIS}$ of the hub 62 by the rotational control mechanism 64 at a predetermined angular velocity. The angular velocity will contribute to the determination of the thickness of the single strip 12 of extruded hot cushion gum that is applied to the crown surface 14. For a thin strip of extrudate, the tire carcass 16 is rotated at a relatively high angular velocity; and, for a thicker strip of extrudate, the tire carcass 16 is rotated at a slower angular velocity. The thickness of the strip 12 applied to the crown surface 14 can be adjusted by controlling the angular velocity at which the tire carcass 16 is rotated. One exemplary means by which to adjust the angular velocity of the tire carcass 16 will now be described.

A surface follower 66 (FIG. 8) may be supported from the rotational control mechanism 64 to abut the crown surface 14 of the tire carcass 16 and is operable, during the rotation of the tire carcass 16, to insure that the angular velocity of the tire carcass 16 remains within the desired limits to provide the desired thickness for the strip 12 of extruded cushion gum to be applied to the crown surface 14, as will be hereinafter more fully described.

Figure 5:
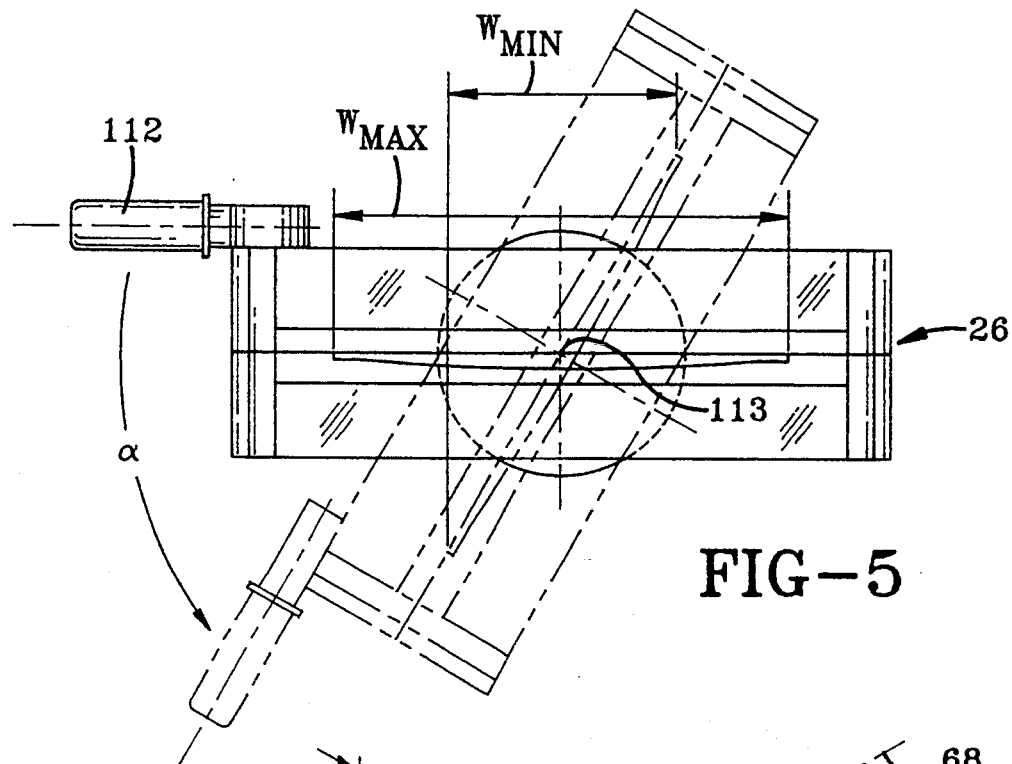
FIG. 5 is a view similar to FIG. 3 which depicts the representative angular range of the die head in the exemplary embodiment.

It is desirable to accommodate tire casings having various widths at the crown surface 14. For example, the representative apparatus 10 is adjustable to accommodate crown surface widths in the range of from about 10.5 inches (26.67 cm) to about 5.25 inches (13.48 cm). Therefore, as is best seen in FIG. 5, the apparatus 10 will apply a strip 12 of hot cushion gum to tire carcasses 16 having a range of from the maximum effective width, designated as $W_{MAX}$ on FIG. 5, to the minimum effective width designated as $W_{MIN}$. The rotary joint connection 34 provides the means by which to select the desired effective width of the extruded strip 12, because the rotary joint connection 34 permits the die head 26 to be rotated through an angle $\alpha$ which, in the exemplary embodiment, is approximately 60 degrees. Because the die head 26 can be selectively positioned at any intermediate angle within the 60 degree angular range $\alpha$, tire carcass 16 widths within a relatively wide range can be accommodated. It should be noted that the true width of the discharge orifice 38 does not change. Rather, the effective width is controlled by angling the die head 26 relative to the sagittal plane 68 (FIGS. 2 and 6) of the tire carcass 16. The maximum width of the strip 12 applied to the crown surface 14 occurs when the die head 26 is oriented at a right angle with respect to the sagittal plane 68. Conversely, the minimum width of a strip 12 applied to the crown surface 14 is achieved when the die head 26 is oriented at the maximum angle $\alpha$ with respect to the disposition of the die head 26 when the maximum strip width is applied to the crown surface 14.

To permit rotation of die head 26, without requiring the loosening of fasteners or the removal of the die head 26 from the extruder 18, a rotary joint connection 34, the details of which are most clearly depicted in FIG. 7, may be interposed between the die head 26 and the extruder 18. The rotary joint connection 34 includes a rotatable block 70, to which the die head 26 is secured, as by a plurality of cap screws 71, and a stationary block assembly 72, which is secured to the extruder 18 and from which the rotatable block 70 is supported. Specifically, the stationary block assembly 72 includes a coupler 74 having first and second ends. The first end 76 of the coupler 74 cooperatively engages the outlet 32 of the extruder 18, and the second end 78 of the coupler 74 cooperatively engages the inlet 80 of the die head 26.

The stationary block assembly 72 also includes a mounting plate 82 which fits over the conical body portion 84 of the coupler 74 to engage a mounting shoulder 86 which extends radially outwardly from the first end 76 of the conical body portion 84. When nut 88 is tightened onto threaded mounting bolt 90 which extends through a clevis 92 on the mounting plate 82, the mounting plate 82 will firmly secure the coupler 74 to the extruder 18. This occurs because the bolt 90 is presented from a pivotal link 91 that is supported from the frame (not shown) of the extruder 18. Hinge links 142 secure the opposite side of the mounting plate 82. The interior of the coupler 74 has a transitional passageway 94, with a larger aperture 96 at the first end 76 and a smaller aperture 98 at the second end 78. The larger aperture 96 communicates with the outlet 32 of the extruder 18 and the smaller aperture 98 communicates with the inlet 80 of the die head 18.

A locating nut 100 is mounted on the threaded second end 78 of the coupler 74 to establish the orientation of the rotatable block 70 relative to the coupler 74 in the stationary block assembly 72. A lock washer 102 interacts between the second end 78 of the coupler 74 and the nut 100 to preclude rotation of the nut 100 relative to the stationary block assembly 72. A thrust washer 104 is disposed between the lock washer 102 and the rotatable block 70 to permit relative rotation therebetween without imposing significant rotationally induced frictional forces on the lock washer 102, and thus the locating nut 100. To facilitate this low torque rotation and still maintain the integrity of the passageway through the coupler 74 and into the die head 26, the die head 26 is spaced outwardly of the second end 78 of the coupler 74 approximately 0.001 to 0.003 inches (0.025 to 0.076 mm), and an annular seal 105 is interposed between the die head 26 and the coupler 74.

As best seen in FIG. 8, the rotatable block 70 has a substantially cylindrical outer surface 106 on which a reference cam 108 is secured. As will become more apparent during the following description, the reference cam 108 is useful in establishing a signal representing the angular disposition of the die head 26, which signal is provided to a microprocessor 110 that is represented diagrammatically in FIG. 8, the purpose of which will become hereinafter more apparent.

A handle 112 is presented from the die head 26 to provide a means by which an operator may manually rotate the die head 26 about the central axis 113 of the stationary block assembly 72 to the desired angular position within the angular range $\alpha$. That is, the operator will rotate the die head 26 to the desired angular position so that the selected width $W_{SEL}$ (FIG. 6) of the strip 12 will match the width of the crown surface 14 for the specific tire carcass 16 to be presented against the contact edge 44 on the abutment lip 42.

Figure 6:
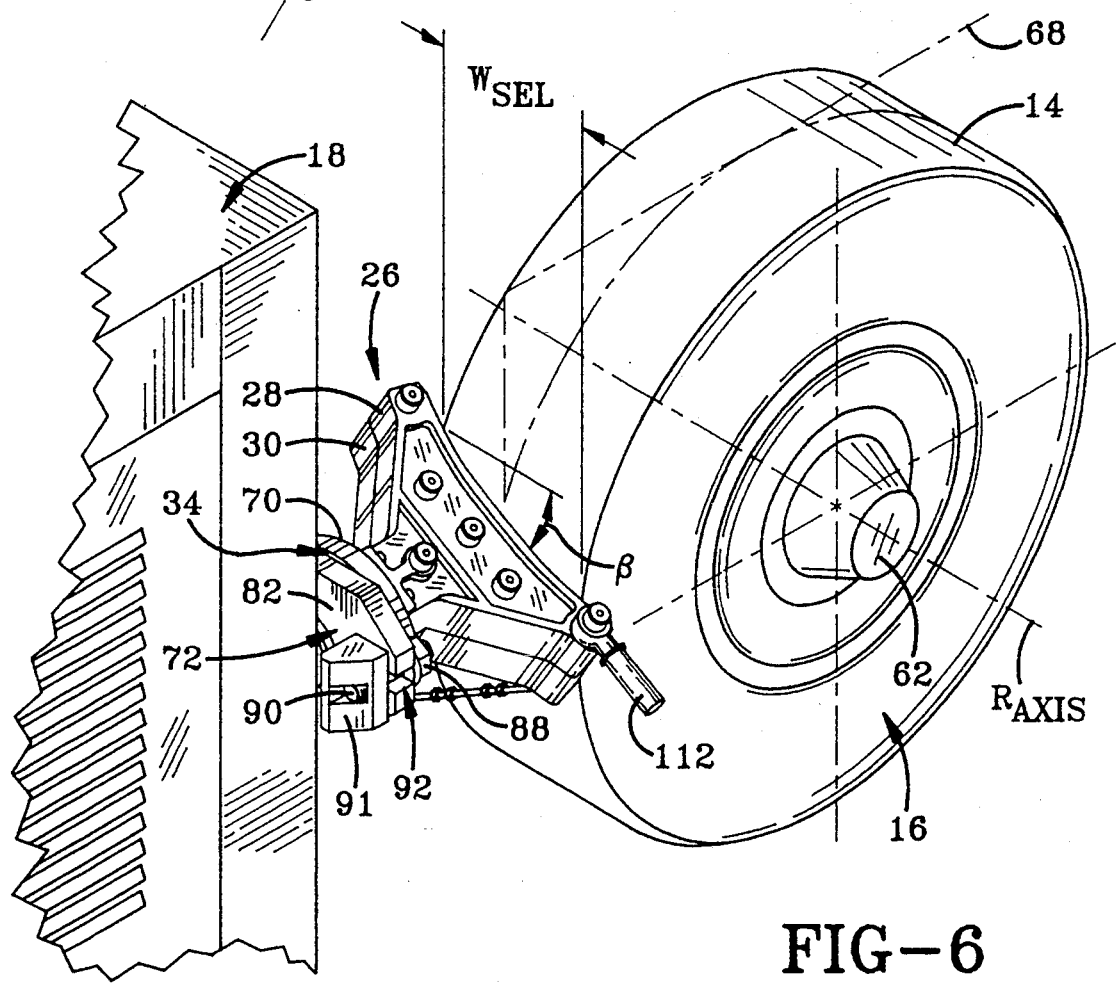
FIG. 6 is a perspective view of the die head and tire carcass showing the die head to accommodate a particular tire width.

A representative angular positioning of die head 26—i.e., angle $\beta$—is depicted in FIG. 6. That is, the die head 26 has been rotated to accommodate a tire carcass 16 having a crown surface 14 of the width, also identified by $W_{SEL}$. The die head 26 will, with the extruder 18 in operation and with the tire carcass 16 being rotated by the rotational control mechanism 64, dispense a single strip 12 of hot cushion gum to cover the crown surface 14 to the exact width $W_{SEL}$ established by the angular disposition of the die head 26.

As seen in FIG. 8, the rotational control mechanism 64 is in communication with the microprocessor 110 by virtue of a conventional encoder 114. The encoder 114 is actuated by the follower 66 in order to provide an input signal to the microprocessor 110 which reflects the exact angular velocity of the tire carcass 16. The microprocessor 110 also receives an input signal relative to the exact angle $\beta$ that has been set within the angular range $\alpha$ through which the die head 26 can be rotated. As depicted, the specific angle, such as $\beta$, through which the die head 26 has been rotated may be read from a potentiometer 116 which is controlled by a composite pinion gear 118 that is, in turn, driven by a rack 120. The rack 120 may comprise the outer surface of a cam follower 122 which is maintained in abutment with the reference cam 108.

As the die head 26 is rotated to the desired angular position $\beta$ within the angular range $\alpha$ the reference cam 108 will be rotated therewith to drive the cam follower 122, and the rack 120, linearly, thereby effecting rotation of the pinion gear 118. The pinion gear 118 is operatively connected to the potentiometer 116 such that rotation of the pinion gear 118 generates a potential that is read by the potentiometer 116 and fed, as an input data signal to the microprocessor 110. Because of the means by which the signal is generated, the signal reflects the angular disposition $\beta$ of the die head 26. Inasmuch as the angular position of the die head 26 determines the width $W_{SEL}$ of the hot cushion gum strip 12 to be laid on the crown surface 14 of the tire carcass 16, the microprocessor 110 has the necessary information to establish the basic angular velocity for the tire carcass 16 and will set the rotational control mechanism 62 accordingly.

The microprocessor 110 may be a conventionally programmable electronic device in the nature of a digital computer programmed with an algorithm which causes the microprocessor 110 to respond to signals received from the encoder 114 and the potentiometer 116 and to generate an appropriate output signal to the rotational control mechanism 64 which effects the desired angular velocity of the tire carcass 16. The microprocessor 110 may also receive input data from a conventional keyboard 124 that is incorporated on the microprocessor 110. The microprocessor 110 may also incorporate a digital display 126 which provides a visual representation of the data entered by the keyboard 124 and/or any other information received, or generated, by the microprocessor 110. In the exemplary embodiment described, the desired thickness of the strip 12 may be entered through the keyboard 124 and the microprocessor 110 feeds an output signal, as determined by the input signals and processed in accordance with a preprogrammed algorithm, to a conventional variable speed drive control 128 which establishes the angular velocity to be developed by the rotational control mechanism 64 and, therefore, the tire carcass 16.

The system shown diagrammatically in FIG. 8 illustrates the input signals to the microprocessor 110 and the output signal from the microprocessor 110. It should be readily appreciated that this system, with the various feedback signals, will control the hot cushion gum strip laying process.

A position sensor 130 (FIG. 1) may, as shown, be disposed on the die head 26, or be otherwise mounted relative thereto. The position sensor 130 determines when the leading edge 132 of the cushion gum strip 12 is approaching the contact edge 44 on the abutment lip 42. When the leading edge 132 of the applied cushion gum strip 12 is at a predetermined location, as determined by the sensor 130, a signal is generated by the sensor 130 which is employed to stop the extrusion process and displace the extruder 18 along the base 22 so as to remove the die head 26 from abutment with the crown surface 14 on the tire carcass 16.

Figure 9:
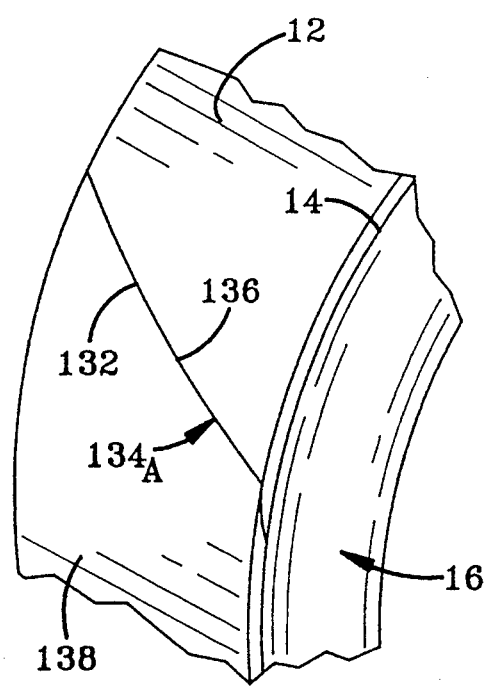
FIG. 9 is a side elevation of a portion of a tire and strip showing an edge-to-edge splice in the strip; and, FIG. 10 is a view similar to FIG. 9 but showing an overlap splice.
Figure 10:
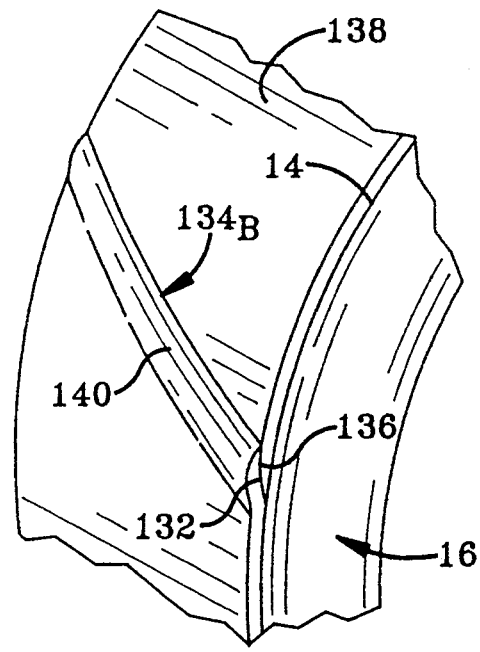

The continued rotation of the tire carcass 16 acts to stretch and separate the strip 12 of extrudate, thereby producing a splice 134 between the leading edge 132 and the trailing edge 136, which is formed by the separation of the strip 12. As depicted in FIG. 9, the splice 134 produced by the engagement of the leading and trailing edges 132 and 136, respectively, can take the form of an end-to-end splice $134_A$, or, as shown in FIG. 10, an overlap splice $134_B$. In an end-to-end splice $134_A$, the outer surface 138 of the cushion gum strip is smooth. An overlap splice $134_B$ produces a modest protuberance 140 caused by the remnants of the trailing edge 136 extending circumferentially beyond the leading edge 134.

From the foregoing description it should be apparent to one skilled in the art that a relatively wide variety of tire carcasses 16 can be covered with a single strip 12 of hot cushion gum utilizing the advantages of the present invention. The hot cushion gum is applied to the crown surface 14 in the exact amount needed. There is no waste, nor is there any offal to be removed at the conclusion of the process. The width, and length, of the strip 12 is precisely variable from a single source, thereby relieving the operator from the need to search an inventory for the proper length and width. The process is brought to fruition without being labor intensive. Manual labor is required only to load and unload the tire carcass 16 and to set the angle $\beta$ of the die head 26 for the particular tire carcass. It is feasible to provide these functions in an automatic fashion, if desired, through conventional engineering practices.

The single strip 12 is extruded and applied in a hot condition to a buffed crown surface 14, eliminating the need for application of adhesives or cements prior to the application of the strip 12. Because the strip 12 of cushion gum is applied in a hot condition, the cushion gum will impregnate the crown surface 14 of the tire carcass 16 providing excellent adhesion, or bonding, between the carcass 16 and the cushion gum strip 12.

It should be further apparent, from the above description of the apparatus 10, that a simple and useful process is provided. Specifically, the preparation of a tire carcass 16 for retreading with a single strip 12 of cushion gum may be accomplished by the unique process which the apparatus 10 is adapted to perform. The process begins by mounting a tire carcass 16 for rotation about the central axis 113 and then bringing the crown surface 14 of the carcass 16 into an operative disposition relative to a die head 26 that has been oriented to present a strip 12 of extrudate having a width $W_{SEL}$ equal to the width of the crown surface 14. By rotating the tire carcass 16 at a controlled angular velocity, and simultaneously extruding a strip 12 of hot cushion gum onto the crown surface 14 of the carcass 16 for a single revolution of he carcass 16, the cushion gum can be applied as a single, accurate layer.

The foregoing description of an exemplary embodiment of the invention has been presented for the purposes of illustration and description. It is not intended to be exhaustive or to limit the invention to the precise form disclosed. Modifications, or variations, are not only possible, but expected, in light of the foregoing disclosure. The representative embodiment was chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

As should now be apparent, the present invention not only teaches an improved apparatus and method for applying hot cushion gum to the crown surface of a tire carcass but also accomplishes the other objects of the invention.

We claim:

1. Apparatus for applying hot cushion gum in a layer of predetermined thickness and width to the crown surface of a tire carcass having a sagittal plane, said apparatus comprising:
   means for rotating the carcass;
   extrusion means for dispensing hot cushion gum;
   die means;
   an internal passage within said die means for conducting hot cushion gum from said extrusion means and forming a strip having a predetermined overall width;
   means for selectively angularly disposing said die means relative to the sagittal plane of the tire carcass to determine the width of the strip as it is applied to the crown surface of the tire carcass from said die means.

2. Apparatus, as set forth in claim 1, further comprising:
   means selectively to control the angular velocity of said means for rotating the carcass to determine the thickness of the strip applied to the crown surface of said tire carcass.

3. Apparatus, as set forth in claim 2, wherein:
   said die means has a first curved surface adapted to be disposed adjacent the crown surface of the tire carcass;
   a second curved surface on said die means adapted to be disposed in spaced relation from the crown surface of the tire carcass;
   said internal passage opening between said first and second curved surfaces.

4. Apparatus, as set forth in claim 3, wherein:
   means are provided to force said first curved surface into deforming engagement with the crown surface on the carcass.

5. Apparatus, as set forth in claim 4, wherein:
   said second curved surface is substantially concentric with said first curved surface.

6. Apparatus according to claim 1, wherein said means for selectively angularly disposing said die means relative to the sagittal plane of the tire carcass includes rotary joint means interposed between said extrusion means and said die means.

7. Apparatus according to claim 6, wherein said rotary joint means includes rotatable block means secured to said die head means, stationary block means secured to said extrusion means, and coupler means interconnecting said rotatable block means and said stationary block means.

8. Apparatus according to claim 7, including cam means on said rotatable block means for establishing a signal proportional to the angular disposition of said die means relative to the sagittal plane of the tire carcass.

9. Apparatus according to claim 7, including seal means interposed between said die means and said coupler means to preclude loss of the hot cushion gum.

10. Apparatus for applying a hot cushion gum layer to a tire carcass mounted for rotation about a central axis, the tire carcass having a crown surface of predetermined width, said apparatus comprising:
    rotational rate control means for rotating said tire carcass at a predetermined angular velocity;
    extrusion means for dispensing a continuous flow of hot cushion gum.
    die means comprising a first die plate means having an outer, curved contact surface capable of being disposed in abutment with the crown surface of a tire carcass;
    a second die plate means secured to said first die plate means;
    said second die plate means having an outer, curved surface spaced a predetermined distance from said carcass and cooperating therewith to provide an accumulating space;
    internal passage means formed between said first and second die plate means for conducting the film of hot cushion gum from the extrusion means to a discharge orifice between said first and second die plate means for presenting the continuous flow in the form of a strip having a predetermined overall width;
    means for establishing the die means at a selected angular position relative to the sagittal plane of the tire carcass for controlling the effective width of the strip applied to the tire carcass.

11. Apparatus, as set forth in claim 10, further comprising:
    means for providing a signal proportional to the angular disposition of said die means relative to said sagittal plane of the tire carcass to means for controlling the rotary speed of the tire carcass.

12. Apparatus, as set forth in claim 11, wherein:
said means for controlling the rotary speed of the tire carcass responds, in part, to the signal proportional to the angular disposition of said die means to produce an output signal.

13. Apparatus, as set forth in claim 12, further comprising:
means for controlling the angular velocity of the tire carcass for providing a predetermined thickness of the hot cushion gum layer to the crown surface of the tire carcass based upon said output signal.

14. Apparatus, as set forth in claim 13, further comprising:
means for sensing a leading edge of the strip of hot cushion gum to control operation of the extrusion means.

15. Apparatus, as set forth in claim 14, further comprising:
means for selectively moving said die head into and out of deforming engagement with the crown surface of the tire carcass.

* * * * *